United States Patent Office 2,936,281
Patented May 10, 1960

2,936,281
REFINING PROCESS

Weldon G. Annable, Mundelein, and William L. Jacobs, Crystal Lake, Ill., assignors to The Pure Oil Company, Chicago, Ill., a corporation of Ohio No Drawing. Application June 26, 1956
Serial No. 593,821

5 Claims. (Cl. 208—27)

This invention relates to a method of refining lubricating oils and waxes by hydrogenation under specific mild conditions in the presence of a molybdenum oxide containing catalyst which has been prepared by impregnation of an alumina carrier with a molybdenum salt followed by decomposition of the molybdenum salt to the oxide. More particularly, this invention relates to a method of decolorizing lubricating oils including residues such as deasphalted oils, bright stocks and neutrals, and waxes including microcrystalline wax, without affecting the other properties thereof by treatment with hydrogen at 450° to 650° F. at 50 to 850 lbs. per square inch pressure, using hydrogen circulation rates of 500 to 5000 c.f./bbl., and space velocities of about 0.2 to 10 in the presence of an impregnated molybdena-alumina catalyst prepared in a particular manner.

It is well known in the art that oils and waxes may be beneficiated by treatment at elevated temperatures with hydrogen using catalysts known to promote the hydrogenation reaction. For this purpose the art lists a large number of metal compounds, particularly the oxides and sulfides of group VI and group VIII metals, paying particular attention to chromium, molybdenum, tungsten, iron, cobalt and nickel. Many references are made to the use of oxides of molybdenum either alone or admixed with other substances, such as alkali metals, alkaline earth metals, oxides, and sulfides, and are promoted with iron, cobalt, or nickel for the purpose of hydrogenating organic materials. Mixtures of various oxides and molybdenum oxide are used to promote the hydrogenation of glyceride oils. In the prior art investigations molybdate salts of various acids are designated as superior hydrogenation catalysts. The present invention is based upon the finding that, for the purpose of decolorizing lubricating oils and waxes without deleteriously affecting the other properties thereof, an impregnated molybdena-alumina catalyst prepared in a particular manner is outstanding in its properties, is superior to the major group of catalytic materials disclosed in the prior art, and is superior to molybdena-alumina catalysts made in other ways.

The art teaches that various addends may be incorporated in refined petroleum products to overcome shortcomings in inherent properties, further augment desirable physical and chemical properties, and bring about new properties. Because of their cost, the necessity of close control of their use, differences in effectiveness and the desirability of attaining a stable and uniform level of good oxidation resistance, or color, or viscosity or other properties in the product, it is equally desirable that the use of additives be minimized or eliminated. Another object of this invention is to provide a process for finishing lubricating oils and waxes and their fractions which, in whole or in part, eliminates the necessity of further fortification by the use of additives.

It is also recognized in the art that only through judicious application of refining methods can the inherent stability, color properties, or viscosity-temperature properties of a lubricating oil or wax be maintained, since many refining operations, including acid treatment, hydrogenation, solvent extraction, adsorption, thermal diffusion, extractive distillation, chemical and clay treatments, remove desirable constitutents as well as undesirable constituents. The higher fractions of petroleum contain the more complex hydrocarbons along with various significant amounts of oxygen, sulfur and nitrogen compounds. This means that removal or transformation of one or more of these types of compounds may bring about a desirable change in the finished product for one purpose and a highly undesirable change for another purpose. The oxidation-inhibiting properties of the naturally occurring sulfur compounds is a good example of this phenomenon, for which there is ample evidence and considerable discussion in the prior art. A lubricating oil which has been severely refined to a very low sulfur content is not as stable to oxidation, nor as resistant to wear, as the same oil which has not been as severely refined and which contains small amounts of residual, naturally occurring sulfur compounds. Nitrogen and oxygen compounds have similar but lesser effects, although certain natural acidic or phenolic bodies have been shown to be exceptions to this rule. The natural sulfur compounds seems to be the principal agents responsible for the stability of straight mineral lubricating oil.

The art has also established that the rate of oxidation of refined lubricating oils, though initially more stable in some respects, is accelerated during use, and the rate of oxidation of unrefined oils or less severely refined oils tends to slow down during use. Recognizing the desirability of maintaining any inherent stability or resistance to oxidation, or resistance to emulsification, that may be present in a refined oil or wax ready for finishing or decolorization, this invention provides a finishing step which does not deleteriously affect any inherent stability or other desirable property. A further object of the invention is to provide a refining or finishing process for lubricating oils and waxes involving mild hydrogenation under certain conditions using a particular catalyst.

It is well known in the art that oils and waxes may be beneficiated by treatment at elevated temperatures with hydrogen using catalyst known to promote the hydrogenation reaction. For this purpose the art lists a large number of metal compounds, particularly the oxides and sulfides of group VI and group VIII metals, paying particular attention to chromium, molybdenum, tungsten, iron, cobalt, and nickel. Many references are made to the use of oxides of molybdenum, either alone or admixed with other components, such as alkali metals, alkaline earth metals, oxides and sulfides; these are promoted with iron, cobalt or nickel for the purpose of hydrogenating organic materials. Mixtures of oxides and molybdenum oxide are used to promote the hydrogenation of glyceride oils. In the prior art investigations molybdate salts of various metals are designated as superior hydrogenation catalysts. The present invention is based upon the finding that for the purpose of decolorizing and stabilizing lubricating oils and waxes without deleteriously affecting the other properties thereof, an impregnated molybdenum oxide-alumina catalyst is outstanding in its properties and is not the equivalent of the large group of catalytic materials disclosed in the prior art.

Accordingly, it becomes a primary object of this invention to provide a process for refining lubricating oils and waxes under certain mild conditions of hydrogenation using a particular molybdenum oxide-alumina catalyst.

A second object of this invention is to provide a process for decolorizing lubricating oils and waxes by hydrogenation at 450 to 650° F. in the presence of a specific molybdena catalyst.

A third object of this invention is to provide a process for decolorizing lubricating oils and waxes without deleteriously affecting such properties as the melting point, penetration, viscosity, VI, gravity and sulfur content.

A further object of the invention is to provide a process for decolorizing lubricating oils containing naturally occurring sulfur compounds under conditions such that the inherent oxidation and extreme pressure properties of the sulfur compounds are not destroyed.

These and further objects of the invention will become apparent or be described as the description thereof proceeds.

It has previously been found that hydrogenation under certain controlled conditions using silver or nickel molybdate, or mixtures of same, produced the unusual result of color improvement without reduction of sulfur content and consequent loss of stability or other desirable attributes of the finished lubricating oil. Although it is known to hydrotreat lubricating oils and waxes using molybdenum oxide-alumina catalysts, the prior art processes generally employ coprecipitated molybdenum oxide and alumina derived from aluminum chloride for this purpose. In accordance with this invention it has been found that alumina derived from aluminum sulfate and impregnated with molybdenum oxide gives the aforestated unusual results which are not shared by molybdenum oxide-alumina catalysts prepared in other ways.

In order to demonstrate the invention the results of a number of experiments are presented in which a comparison is made of different catalytic agents prepared by ordinary methods of activation, by co-precipitation methods and by impregnation methods. In Table I following, results are presented showing the treatment of microcrystalline wax with various catalysts under the following conditions:

Temperature _____ 550° F.
Pressure _____ 500 lbs. per square inch.
Space velocity _____ 1.0.
Hydrogen rate _____ 2500 s.c.f./bbl.

This microcrystalline wax had the following properties:

Color, A.S.T.M. _____ +4½
Melting point, ° F. _____ 179
Penetration @ 77° F. _____ 17
Penetration @ 120° F. _____ 84
Total sulfur (weight percent) _____ 0.14 percent of molybdenum oxide on analysis, the balance being alumina.

The impregnated molybdenum oxide-alumina catalyst used in run number 3 of Table I is prepared from aluminum sulfate. This catalyst is prepared by heating a solution containing 5000 grams of aluminum sulfate in 15,000 grams of water to 210–130° F. and maintaining the solution at this temperature during precipitation of the aluminum hydroxide. The solution is then stirred and 50,000 grams of aqueous 20% ammonia solution slowly added over a period of about 30 minutes. The precipitate is heated for another 30 minutes at 120–150° F. The precipitate is washed free of ammonium sulfate. The washed precipitate is next filtered and dispersed in a solution containing 560 grams of ammonium molybdate, $(NH_4)_6Mo_7O_{24} \cdot 4H_2O$. The impregnated alumina mass is dried and extruded or pelleted to form shaped particles. The shaped particles are calcined at 850–950° F. for 10 hours to dry and decompose ammonium molybdate leaving molybdenum trioxide on alumina. This catalyst, being the preferred composition, contains about 9.0 wt. percent of molybdenum oxide, the balance being substantially entirely alumina (about 91.0%).

The alumina used in run number 4 of Table I is the ordinary activated alumina of commerce prepared from aluminum nitrate. The activated carbon used in run number 5 of Table I is also a known commercial product.

From the results shown in Table I, it is apparent that the impregnated molybdena-alumina catalyst used in run number 3 is outstanding in its ability to decolorize the wax charged. An ASTM color designation of 1+ is difficult to obtain and represents a highly acceptable commercial product. ASTM color designations of 1½ are also difficult to obtain.

In order to further demonstrate the invention a deasphalted oil which was obtained from a vacuum residuum by propane deasphalting was treated with hydrogen in the presence of an impregnated molybdena-alumina catalyst prepared as above described. The conditions for hydrogenation of the deasphalted oil were as follows:

*Hydrogenation reaction conditions*

Temp., ° F. _____ 550
Press., p.s.i.g. _____ 100
Space velocity _____ 1.3
H₂ rate, s.c.f./bbl. _____ 2500
Yield-bbls./ton _____ 43.9

The following table makes a comparison of the properties of the charge oil and the product obtained:

TABLE I

| Run No | 1 | 2 | 3 | 4 | 5 |
|---|---|---|---|---|---|
| | Cobalt Molybdate | Co-prec. MoO₃—Al₂O₃ (from AlCl₃) | Impreg. MoO₃—Al₂O₃ (from Al₂(SO₄)₃) | Al₂O₃ | Activated Carbon |
| Yield, Bbls./Ton | 14.7 | 48.7 | 59.5 | 36.0 | 46.3 |
| Color, A.S.T.M. | 4+ | +2 | 1+ | +2½ | +3½ |
| Melting Point, ° F | 179 | 181 | 180 | 181 | 180 |
| Penetration @ 77° F | 16 | 12 | 12 | 12 | 16 |
| Penetration @ 120° F | 87 | 95 | 97 | 98 | 89 |
| Total Sulfur (Wt. percent) | 0.08 | 0.12 | 0.11 | 0.13 | 0.12 |

The preparation of cobalt molybdate catalyst used in run number 1 of Table I is described in United States Patent 2,687,381, particularly Example I of this patent.

The co-precipitated molybdenum oxide-alumina catalyst used in run number 2 is prepared from aluminum chloride and is a well known catalytic material. This catalyst is prepared by mixing solutions of aluminum chloride and ammonium molybdate. The mass is precipitated by the addition of ammonium hydroxide. The precipitate is washed, dried, pelleted and calcined. The finished co-precipitated catalyst contained about 9.0 wt.

TABLE II

| Characteristics | Charge | Product |
|---|---|---|
| API Gravity | 21.6 | 21.4 |
| Color, ASTM | 8 | 5+ |
| Carbon Res. Conradson, Wt. percent | 2.00 | 1.71 |
| Flash C.O.C., ° F | 570 | 565 |
| Vis. SUS @ 210° F., sec | 175.8 | 173.9 |
| 1948 Neut. No | 1.61 | <0.03 |
| Total Sulfur, Wt. percent | 1.23 | 1.22 |

As seen from Table II, the process of this invention is applicable to the treatment of deasphalted oils for the purpose of decolorizing same and reducing the neutralization number, which changes are accomplished without substantial reduction in the naturally-occurring sulfur compound content. As before stated, the invention is carried out by treating lubricating oil residuals, deasphalted oils, bright stocks, neutrals or waxes, including microcrystalline waxes, with hydrogen at temperatures from about 450° to 650° F., using pressures of from 50 to 850 lbs. per square inch and hydrogen circulation rates of 500 to 5000 s.f./bbl., with space velocities of about 0.2 to 10, in the presence of an impregnated molybdenum oxide alumina catalyst prepared from an aqueous solution of aluminum sulfate. Broadly, the amount of molybdenum oxide impregnated on the alumina may range from about 5 to 12 wt. percent based on the weight of the catalyst mass. Preferably about 9 wt. percent of molybdenum oxide is used with the alumina. The alumina used is substantially pure $Al_2O_3$ containing only very small amounts of inactive impurities.

In preparing the catalyst of this invention, an aqueous solution of aluminum sulfate is heated to a temperature between about 120° to 130° F. during the precipitation of the aluminum hydroxide by the addition of ammonia. In carrying out the precipitation about 10 grams of ammonia is used per 5 grams of aluminum sulfate. An additional heating period at temperatures of about 120° to 150° F. is used to coagulate the aluminum hydroxide. The water-wash step is conducted using a sufficient amount of water to free the precipitated aluminum hydroxide of ammonium sulfate. The impregnation step is carried out by commingling the filtered, washed, precipitate with a solution of ammonium molybdate. After thorough dispersion of the ingredients, the impregnated alumina mass is dried in an oven at a temperature sufficient to drive off a substantial portion of the water present. The temperature of drying may be about 200° to 212° F. The final calcination step is conducted under conditions to decompose the ammonium molybdate to form molybdenum trioxide impregnated in the alumina.

In carrying out the invention, no substantial departure from the hydrogenation conditions disclosed herein need be undertaken when treating different lubricating oil fractions or waxes. Residues such as bright stocks or deasphalted oils may be treated at any point in their processing after the step of deasphalting has been completed. Similarly, neutrals may be treated at any point in their processing after the vacuum distillation step. Since the details in the manufacture of bright stocks and neutrals are well known, there is no necessity for repeating same in this specification.

What is claimed is:

1. The method of decolorizing hydrocarbon materials selected from the group consisting of refined lubricating oils and waxes of petroleum origin without substantially affecting the other physical characteristics including viscosity, sulfur content, and penetration, which consists in contacting said hydrocarbon materials with hydrogen at a temperature of about 450° to 650° F. in the presence of a catalyst consisting of an alumina base impregnated with about 9.0 percent by weight of molybdenum oxide based on the weight of the mass of the catalyst, said catalyst being prepared by precipitating aluminum hydroxide from aluminum sulfate, dispersing the precipitated aluminum hydroxide in a solution of ammonium molybdate, followed by decomposing ammonium molybdate to molybdenum trioxide by heating the resultant impregnated mass to a temperature of about 850° to 950° F. and recovering from said hydrogenation reaction a product having improved color and substantially the original content of sulfur.

2. The method in accordance with claim 1 in which the hydrocarbon material is wax.

3. The method in accordance with claim 1 in which the hydrocarbon material is a refined lubricating oil.

4. The method of reducing the neutralization number and decolorizing refined lubricating oils without substantially affecting the viscosity characteristics and sulfur content which consists in subjecting said refined lubricating oils to hydrogenation in the presence of about 2500 s.c.f. of hydrogen per barrel of lubricating oil, at a temperature of about 550° F. and a pressure of about 100 p.s.i.g., using a space velocity of about 1.3 in the presence of a catalyst consisting of about 9.0 percent by weight of molybdenum oxide on an alumina carrier, said catalyst being prepared by precipitating aluminum hydroxide from aluminum sulfate, dispersing the precipitated aluminum hydroxide in a solution of ammonium molybdate, decomposing said ammonium molybdate to molybdenum trioxide by heating the resultant impregnated mass to a temperature of about 850° to 950° F., and recovering from said hydrogenation reaction a product having improved color and substantially the original viscosity characteristics and sulfur content.

5. The method of decolorizing a petroleum wax without substantially affecting the melting point, sulfur content or penetration characteristics of said wax which consists in subjecting said petroleum wax to hydrogenation in the presence of about 2500 s.c.f. of hydrogen per barrel of said wax, at a temperature of about 550° F. and a pressure of about 100 p.s.i.g., using a space velocity of about 1.3 in the presence of a catalyst consisting of about 9.0 percent by weight of molybdenum oxide on an alumina carrier, said catalyst being prepared by precipitating aluminum hydroxide from aluminum sulfate, dispersing the precipitated aluminum hydroxide in a solution of ammonium molybdate, decomposing said ammonium molybdate to molybdenum trioxide by heating the resultant impregnated mass to a temperature of about 850° to 950° F., and recovering fram said hydrogenation reaction a product having improved color and substantially the original melting point, sulfur content and penetration characteristics.

References Cited in the file of this patent

UNITED STATES PATENTS

| | | |
|---|---|---|
| 2,654,696 | La Porte | Oct. 6, 1953 |
| 2,658,856 | Perry et al. | Nov. 10, 1953 |
| 2,706,167 | Harper et al. | Apr. 12, 1955 |
| 2,717,857 | Bronson et al. | Sept. 13, 1955 |
| 2,739,132 | Riedl | Mar. 20, 1956 |
| 2,768,933 | Burton et al. | Oct. 30, 1956 |